(12) United States Patent
Welsch et al.

(10) Patent No.: US 11,143,524 B2
(45) Date of Patent: Oct. 12, 2021

(54) DISPLACEMENT SENSOR

(71) Applicant: Robert Bosch GmbH, Stuttgart (DE)

(72) Inventors: Wolfgang Welsch, Heidelberg (DE); Michael Kleinknecht, Lehrensteinsfeld (DE); Mathias Kimmerle, Steinheim (DE); Sina Fella, Langenbrettach (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 16/473,533

(22) PCT Filed: Dec. 28, 2017

(86) PCT No.: PCT/EP2017/084682
§ 371 (c)(1),
(2) Date: Jun. 25, 2019

(87) PCT Pub. No.: WO2018/122283
PCT Pub. Date: Jul. 5, 2018

(65) Prior Publication Data
US 2020/0149924 A1 May 14, 2020

(30) Foreign Application Priority Data

Dec. 29, 2016 (DE) ..................... 10 2016 226 301.3
Dec. 13, 2017 (DE) ..................... 10 2017 222 674.9

(51) Int. Cl.
*G01D 5/14* (2006.01)
*H02K 15/08* (2006.01)

(52) U.S. Cl.
CPC ............. *G01D 5/145* (2013.01); *H02K 15/08* (2013.01)

(58) Field of Classification Search
CPC ................................ G01D 5/145; H02K 15/08
See application file for complete search history.

(56) References Cited

U.S. PATENT DOCUMENTS 6,545,463 B1  4/2003  Dettmann et al.
9,927,260 B2 *  3/2018  Maiterth ................ G01D 5/145
(Continued)

FOREIGN PATENT DOCUMENTS

DE          199 10 636 A1    9/2000
DE    10 2010 019 077 A1   11/2011
(Continued)

OTHER PUBLICATIONS

International Search Report corresponding to PCT Application No. PCT/EP2017/084682, dated Mar. 14, 2018 (German and English language document) (7 pages).

*Primary Examiner* — Reena Aurora
(74) *Attorney, Agent, or Firm* — Maginot, Moore & Beck LLP (57) ABSTRACT

A displacement sensor has a magnetic measuring transducer and at least two sensor units, which are arranged at different positions spaced from each other, the measuring transducer being slidably mounted relative to the sensor units. The measuring transducer is magnetized such that it has a magnetic field which rotates at least partially about an axis of rotation along the measuring transducer, and the axis of rotation of the magnetic field runs parallel to the sliding direction of the measuring transducer. The sensor units are designed to each sense two magnetic measured variables proportionally to the magnetic field strength, both measured variables being sensed by both sensor units.

15 Claims, 4 Drawing Sheets

(56) References Cited

U.S. PATENT DOCUMENTS

| | | | |
|---|---|---|---|
| 10,502,588 B2* | 12/2019 | Ausserlechner | ..... G01D 5/2497 |
| 2009/0021244 A1* | 1/2009 | May | ....................... G01D 5/145 |
| | | | 324/207.2 |
| 2016/0061630 A1 | 3/2016 | Ausserlechner et al. | |

FOREIGN PATENT DOCUMENTS

| | | |
|---|---|---|
| DE | 10 2015 114 608 A1 | 3/2016 |
| EP | 0 979 988 A1 | 2/2000 |
| EP | 2 159 546 A2 | 3/2018 |
| JP | 2003-524778 A | 8/2003 |
| JP | 2007-309934 A | 11/2007 |

* cited by examiner

DISPLACEMENT SENSOR

This application is a 35 U.S.C. § 371 National Stage Application of PCT/EP2017/084682, filed on Dec. 28, 2017, which claims the benefit of priority to Serial No. DE 10 2016 226 301.3, filed on Dec. 29, 2016 in Germany, and which claims the benefit of priority to Serial No. DE 10 2017 222 674.9, filed on Dec. 13, 2017 in Germany the disclosures of which are incorporated herein by reference in their entirety.

The disclosure relates to a displacement sensor comprising a magnetic measurement value transducer and comprising at least two sensor units, wherein the measurement value transducer is mounted such that it can be displaced relative to the sensor units, and wherein the measurement value transducer is magnetized in such a way that it has a magnetic field which rotates at least in sections about a rotation axis which is oriented parallel in relation to the displacement direction of the measurement value transducer or in a plane perpendicular in relation to the displacement direction along the measurement value transducer.

The disclosure further relates to a method for operating a displacement sensor of this kind.

BACKGROUND

A displacement sensor of the generic type is known, for example, from patent specification EP 0 979 988 B1. Said displacement sensor has a helically magnetized measurement value transducer and also two measurement value sensors which are arranged at a distance from one another next to one another, that is to say axially level or virtually level, in the displacement direction of the measurement value transducer. The measurement value sensors each measure a magnetic field component, wherein the sliding position of the measurement value transducer is determined from the two ascertained magnetic field components.

The current concepts for determining the absolute position of a magnet are usually based on the absolute measurement principle of the magnetic angle which prespecifies the direction of a magnetic field to a sensor unit. This magnetic field is generated by the measurement value transducer and typically rotates as displacement of the measurement value transducer progresses. In this case, detection of the magnetic angle usually takes place in one position by means of a Hall or XMR sensor. However, a measurement technique of this kind is sensitive to external interference fields. In order to make the measurement robust against interference fields of this kind, it is also known to provide two measurement value sensors, which each sense two magnetic field components which are perpendicular to one another, and also a rotating magnetic field. Therefore, four magnetic field components are measured in total. In this case, the position is given by the so-called difference angle which is formed from the difference measurement fields by means of the a tan, that is to say from the differences between the field components of the same reading direction of the two measurement value sensors; a sensor of this kind is called a difference angle displacement sensor in the text which follows. In this case, it is known that the sensor units are located along the measurement path and the magnetic field rotates in the direction of the sliding movement, so that the rotation axis of the magnetic field is transverse in relation to the sliding or movement direction. In other words, the magnetic field rotates in a plane along which the measurement value transducer is pushed. Since a complete revolution of a difference angle is often intended to be detected in order to acquire an unambiguous measurement signal, this principle is however limited only to short sliding paths because, otherwise, the resulting difference measurement field between the measurement points and the measurement sensors is smaller than the typical sensing limit.

SUMMARY

The displacement sensor according to the disclosure having the features described herein has the advantage that it is insensitive to interference fields even in the case of relatively long sliding paths or measurement paths. According to the disclosure, provision is made for the displacement sensor to allow a difference angle measurement. To this end, the at least two sensor units are designed to detect in each case two magnetic measurement variables proportionally in relation to the magnetic field strength, wherein both measurement variables are detected by both sensor units. A measurement variable is intended to be understood to mean a property of the measurement value transducer to be detected. Since the two sensor units are arranged in different positions, they can generally not ascertain the same measurement value when detecting the same measurement variable. Instead, two measurement values of the same measurement variable are always ascertained in different positions. By virtue of simple difference value formation from the two ascertained measurement values of the same measurement variable, it is therefore possible to always detect the correct position of the measurement value transducer, irrespective of the presence of external, in particular magnetic, fields because the interference field has the same effect on both measurement values of the measurement variable. Therefore, advantageous detection of the sliding position of the measurement value transducer which detection is insensitive to interference fields is ensured, so that the displacement sensor can also be used in applications in which interference fields are expected.

According to one preferred embodiment of the disclosure, the displacement sensor has an evaluation device which is designed to form in each case one difference value from the measurement variables detected by both sensor units, and to determine the position or displacement position from the difference values. The abovementioned advantages are produced as a result.

Furthermore, provision is preferably made for each sensor unit to detect, as measurement variables, magnetic field components of the measurement value transducer in at least two measurement directions which are perpendicular in relation to one another. If a coordinate system with three axes (x, y, z) which are oriented perpendicularly in relation to one another is applied to the displacement sensor, in particular to the measurement value transducer, the sensor units detect, according to the above-described embodiment, either magnetic field components in the x and y direction or in the x or y and z direction, wherein the z direction is parallel in relation to the sliding direction of the measurement value transducer, so that the y and x directions lie in a plane perpendicular in relation to the sliding direction or have a plane of this kind.

In this case, two measurement directions are preferably oriented perpendicularly in relation to the sliding direction. Therefore, measurement variables are detected in the x and y direction.

As an alternative, at least one measurement direction is oriented parallel in relation to the sliding direction and at least one further measurement direction is oriented perpendicularly in relation to the sliding direction, so that measurement values are ascertained in the x and z or y and z direction. Correct position determination of the measurement value transducer is also advantageously rendered possible in this way.

According to a preferred development of the disclosure, provision is made for the sensor units to be arranged next to one another in the displacement direction. Therefore, the two measurement value sensors are situated next to one another or parallel in relation to one another at the same or virtually the same level as seen in the sliding direction and detect the magnetic field of the measurement value transducer which now does not rotate in the plane of the sliding direction but rather in the plane perpendicular thereto. With preference, (i) the measurement value sensors are arranged next to one another at the same level or are offset in relation to one another as seen in the displacement direction. As an alternative, (ii) provision is preferably made for the measurement value sensors to be arranged one behind the other in the displacement direction. In cases (i) and (ii), an embodiment is rendered possible in which a clamping region is required, within which clamping region the difference angle which is determined by the sensor units remains constant in spite of a further displacement of the measurement value transducer, wherein the magnitude of the detected magnetic field remains high enough for detection. In this case, the sensitivity in the rest of the measurement region and/or the total measurement path can be increased. This embodiment has the further advantage that the difference measurement fields of the two measurement directions have a very similar magnitude, so that a uniform profile of the total difference field strength is achieved over the measurement path. According to a preferred development of the disclosure, a plurality of difference angles, and not just one difference angle, are evaluated. As a result, electrically independent measurement signals can be obtained and/or the accuracy of the determined position can be increased.

According to a preferred embodiment of the disclosure, the magnetization of the measurement value transducer has a constant gradient at least in sections. In this case, the gradient of the magnetization is to be understood to mean the gradient of the profile of the rotating magnetic field along the rotation axis parallel in relation to the displacement direction of the measurement value transducer. Simple determination of the position or sliding of the measurement value transducer is ensured in this way. This leads to a linear profile of the difference angle measured at the sensor, depending on the position.

According to a further embodiment of the disclosure, provision is preferably made for the gradient to change at least in sections. In this way, it is possible to adjust the sensitivity of the displacement sensor to different sliding positions or sections of the measurement value transducer. Therefore, higher sensitivity to a displacement of the measurement value transducer can be achieved, for example, by a section with a reduced gradient. This means that the measured difference angle changes more rapidly in a specific path section. As a result, the displacement sensor can be advantageously adjusted to different boundary conditions in a simple manner.

The gradient preferably changes continuously or alternatively discontinuously. In both cases, advantageous displacement measurement is ensured.

The measurement value transducer is particularly preferably at least substantially helically magnetized. Therefore, the measurement value transducer is formed from an individual permanent magnet or magnet body which is magnetized in such a way that the desired magnetic field is produced with a rotation in a plane perpendicular in relation to the displacement direction or about a rotation axis which is oriented parallel in relation to the displacement direction. As a result, the measurement value transducer is simple to handle and not or hardly susceptible to faults. Furthermore, the helical magnetization can create a very accurate profile of the magnetic field along the measurement value transducer in respect of its orientation, so that highly accurate measurement results are ensured. Furthermore, the rotating profile of the magnetic field with different gradients, which are continuously or discontinuously changed, can also be realized in a simple and cost-effective manner in this way.

Furthermore, provision is preferably made for the sensor units to be mounted fixedly on a housing and for the measurement value transducer to be mounted displaceably in the housing. Therefore, the measurement value transducer can be displaced relative to the measurement value sensors and in so doing preferably can be connected or is connected to the object of which the movement path is intended to be ascertained by the displacement sensor.

According to an alternative embodiment of the disclosure, provision is made for the measurement value transducer to be mounted fixedly in a housing and for the sensor units to be mounted displaceably in the housing on a support. In this case, the sensor units are then therefore fixedly connected to the object of which the displacement path is intended to be monitored or ascertained. To this end, the measurement value sensors are expediently arranged on the support in order to ensure their orientation in relation to one another and also in relation to the measurement value transducer. In this case, the support and the measurement value transducer can be held on one another by guide means in such a way that a correct orientation of the measurement value transducer in relation to the support and sensor units is always ensured. The guide means may be, for example, a guide groove and a guide projection which engages into the guide groove.

According to a preferred development of the disclosure, provision is made for the sensor units for detecting the measurement variables to have two- or multi-dimensional measurement sensors, or a plurality of measurement sensors for in each case one measurement variable. Therefore, provision is preferably made for at least one of the measurement value sensors to be designed as a Hall sensor. Hall sensors are common and can also be used in a cost-effective manner in order to determine difference measurement fields. As an alternative, provision is also preferably made for at least one of the measurement value sensors to be designed as an XMR sensor, that is to say as a thin-film resistance sensor. This type of sensor is also common and can therefore be used in a cost-effective manner. Expediently, both measurement value sensors are of identical design.

According to a preferred development of the disclosure, provision is made for the measurement value transducer to be formed from at least one permanent magnet. In order to achieve the advantageous magnetic field, the permanent magnet has been correspondingly magnetized beforehand, as already explained above.

According to an alternative embodiment of the disclosure, provision is preferably made for the measurement value transducer to be formed from a plurality of permanent magnets which are connected to one another. This makes it easier, for example, to realize the desired rotating magnetic field. In this case, the measurement value transducer preferably has a main body as the supporting element on which the permanent magnets are arranged and held.

In this case, the plurality of permanent magnets preferably bear one against the other, as a result of which a particularly compact embodiment of the measurement value transducer is ensured. In an embodiment of this kind, an additional supporting element or an additional main body can also be dispensed with. As an alternative, the permanent magnets are preferably arranged in such a way that they have a gap between them. In this case, the gap is designed, in particular, as an air gap. In this case, the permanent magnets are preferably arranged on a common main body or supporting element in order to reliably ensure the assignment of the permanent magnets to one another and the orientation of the magnetic field.

According to a preferred development of the disclosure, provision is also made for the measurement value transducer to be designed in such a way that it has at least one clamping region—as seen in its longitudinal extent—in which the gradient of the rotation of the magnetic field is equal to zero. This produces a so-called clamping region within which the signal which is detected by the measurement sensor does not change. Therefore, owing to the clamping region, instead of a specific measurement value, an item of information, "on" or "off", can be output for example, as a result of which the range of use of the displacement sensor is further increased. The clamping region is preferably formed at one end of the measurement value transducer. As an alternative, a respective clamping region is preferably formed at both ends of the measurement value transducer. In addition or as an alternative, said clamping region is particularly preferably formed centrally or between two sections with a gradient which is not equal to zero. In this case, the sections which adjoin the clamping section preferably each have the same gradient or different gradients.

Furthermore, provision is preferably made for the measurement value transducer to have a triangular or polygonal, round, circular or partially circular cross section. Depending on the embodiment, a cross section can prove to be advantageous here. In particular, for reliable orientation of the measurement value transducer in relation to the measurement sensors, a cross section which differs from a circular shape is advantageous in order to prevent rotation between the housing and the measurement value transducer when the measurement value transducer is mounted such that it can be displaced through the housing itself.

Furthermore, provision is preferably made for the measurement value transducer to be magnetized in such a way that its magnetization rotates through at least 270°, in particular through 360°. However, it goes without saying that smaller rotation angles are possible. It is also feasible for the magnetic field to be rotated beyond 360° along the measurement value transducer. However, as already mentioned above, it is possible, owing to the advantageous design of the measurement value transducer in particular with different gradients of the magnetic field rotation, for unambiguous measurements taking into account the gradients to also be possible when the magnetic field rotates beyond more than 360°. This opens up new fields of application and also particularly long displacement measurement paths.

If the measurement value transducer is made up of a plurality of permanent magnets, so that the magnetic field rotates in stages in several steps, said steps are preferably of equal length in the sliding direction, as a result of which the linearity of a characterisitic curve of the difference angle displacement sensor is further increased. As an alternative, the steps are of different length. In order to influence the linearity of the characterisitic curve, one or more soft-magnetic metal sheets can also be fitted to one side of the measurement value transducer.

The method according to the disclosure for operating the displacement measurement sensor is distinguished in that in each case two measurement variables are detected by means of the measurement value sensor devices, wherein both measurement variables are detected by both sensor units, and in that a difference value is ascertained from the measurement variables which are detected by the two sensor units and is taken into account for determining the sliding position of the measurement value transducer. This results in the advantages mentioned above.

Further advantages and preferred features and combinations of features can be found, in particular, in the above description and also in the claims.

BRIEF DESCRIPTION OF THE DRAWINGS

The disclosure will be explained in more detail below with reference to the drawings, in which.

DETAILED DESCRIPTION

Figure 1:
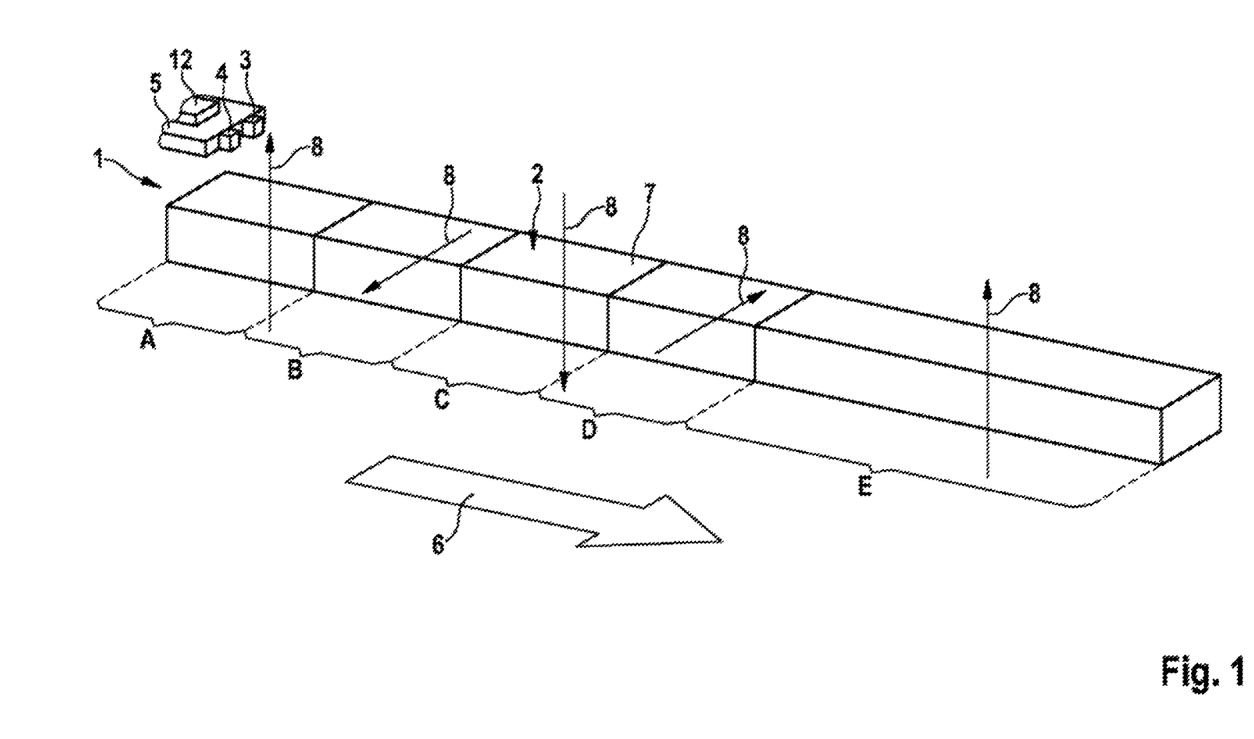
FIG. 1 shows a difference angle displacement sensor in a simplified perspective illustration according to a first exemplary embodiment.

FIG. 1 shows a simplified illustration of a displacement sensor 1 which has a measurement value transducer 2 which is of rod-like design and can be connected to an object, such as a piston or the like for example, in order to detect the movement of said object. In this case, two measurement sensor units 3, 4, which are shown in highly simplified form in FIG. 1, are associated with the measurement value transducer 2.

The measurement value transducer 2 is mounted in a displaceable manner along its longitudinal extent or in an axially displaceable manner in a housing 5 which also supports the sensor units 3, 4. The housing 5 is only partially illustrated in FIG. 1. The displacement direction of the measurement value transducer 2 is indicated by an arrow 6.

According to the first exemplary embodiment, the measurement value transducer 2 is designed as a permanent magnet 7 of which the magnetization direction rotates about the longitudinal axis of the measurement value transducer 2 in 90° steps. The rotation axis of the magnetic field or of the magnetization of the permanent magnet 7 is therefore oriented parallel in relation to the displacement direction and corresponds, in particular, to the center longitudinal axis of the measurement value transducer 2. The magnetization direction is indicated by arrows 8 in FIG. 1. The magnetization or the magnetic field therefore rotates along the displacement direction of the measurement value transducer 2 through 360° in the present case.

Figure 2:
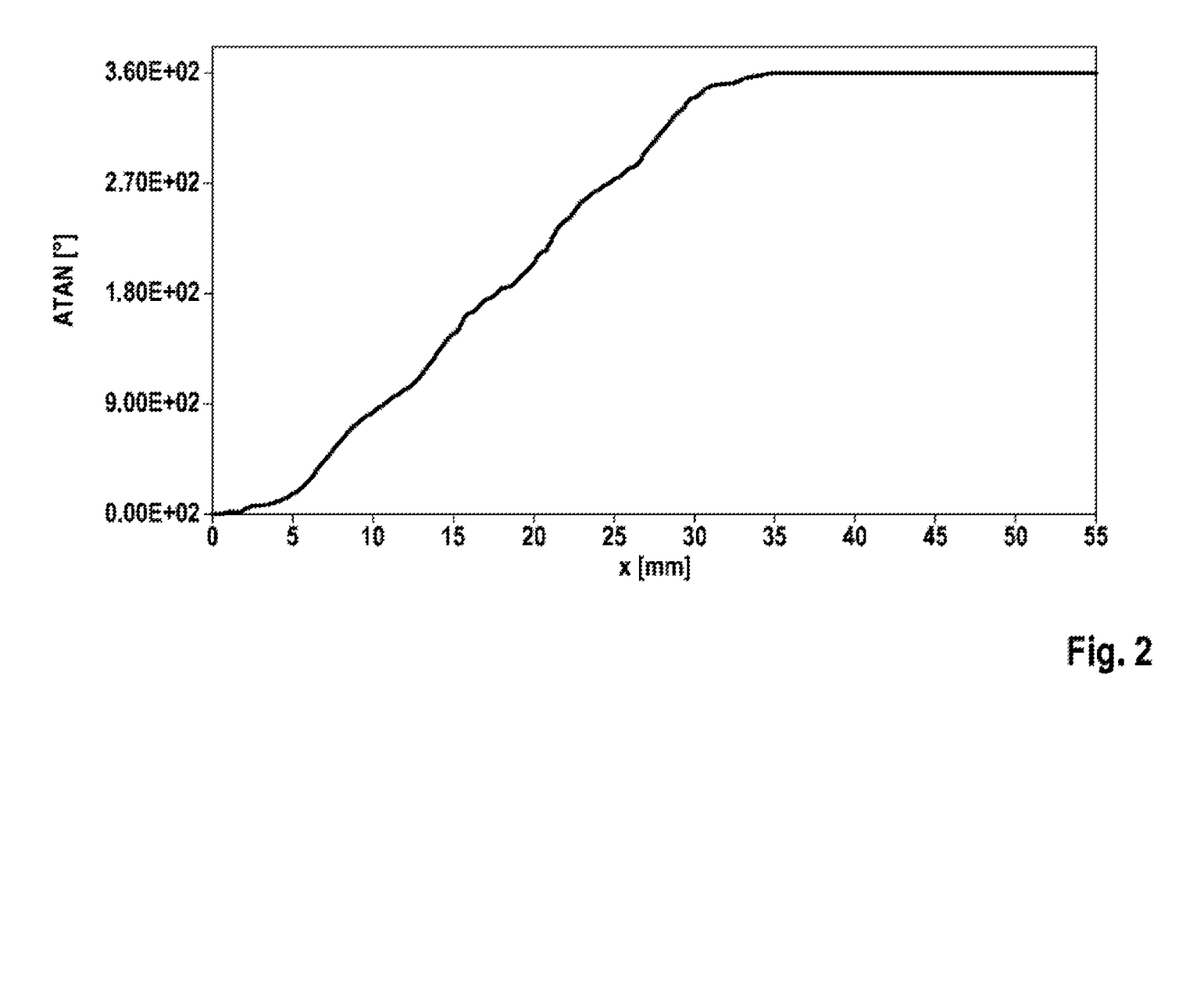
FIG. 2 shows an exemplary characterisitic curve of the difference angle displacement sensor according to the first exemplary embodiment.

In addition, FIG. 2 shows a measurement characterisitic curve K, which results from the embodiment of the displacement sensor 1, over the movement path x of the measurement value transducer 2. Owing to the 90° steps, the permanent magnet 7 is split into five sections A, B, C, D and E within which the magnet direction points in a respective direction. Therefore, the sections A, B, C, D, E correspond to the steps in which the magnetization direction is changed. The last step or last section E of the measurement value transducer 2 or of the permanent magnet 7 is selected to be longer than the other steps A, B, C, D in this case. This produces the plateau at the end of the characterisitic curve K, so that it supplies an output signal with a wide clamping region.

Figure 3:
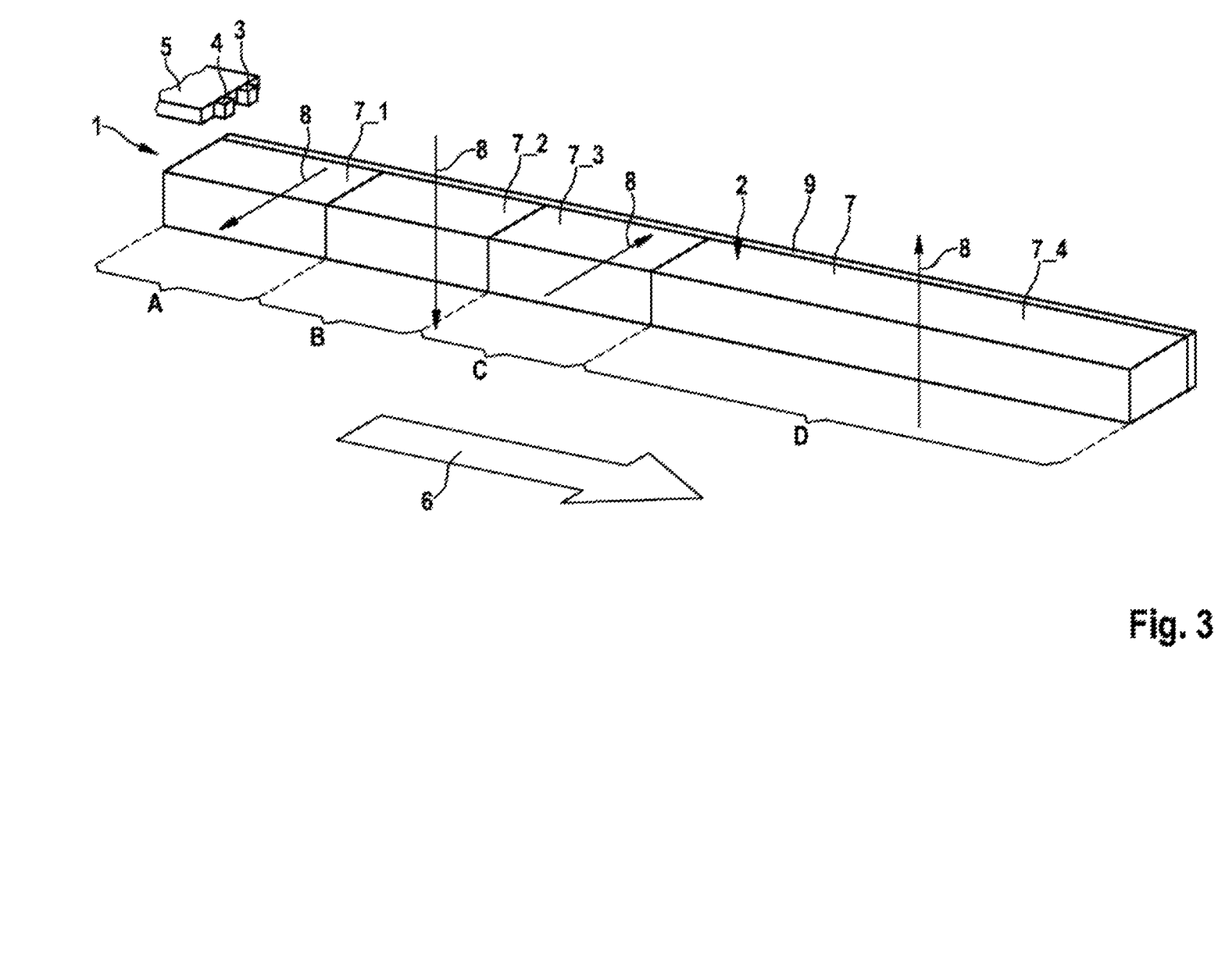
FIG. 3 shows the difference angle displacement sensor according to a further exemplary embodiment.

FIG. 3 shows a further exemplary embodiment of the displacement sensor 1, wherein elements which are already known from the preceding exemplary embodiment are provided with the same reference symbols and reference is made to the above description in this respect. Substantially only the differences will be discussed in the text which follows.

According to the second exemplary embodiment, provision is made for the measurement value transducer 2 to be formed from a plurality of individual permanent magnets 7_1, 7_2, 7_3 and 7_4 which bear directly one against the other. In this case, the permanent magnets 7_1 to 7_4 are fastened, for example, to a main body 9. The permanent magnets 7_1 and 7_4 are magnetized differently, as is shown once again by the arrows 8. This results in a smaller number of sections A to D with different magnetization directions. In this case, the permanent magnets 7_1-7_4 are magnetized in such a way that the magnetic field or the magnetization rotates through only 270°, but likewise in 90° steps, in the present case. According to this embodiment, the difference angle displacement sensor 1 has a smaller angular range but the start position and end position are clearly different, whereas in the exemplary embodiment of FIG. 1 the first and the last position each have the same magnetization direction. Furthermore, only four permanent magnets are required, this making the system cost-effective overall. However, in the second exemplary embodiment, the measurement value transducer 2 can also be formed by a single permanent magnet 7 with different magnetization directions. A permanent magnet is correspondingly magnetized for this purpose.

Since the axial length of the last permanent magnet 7_4 or of the section D is longer than that of the other section A, B, C in the second exemplary embodiment too, a plateau which supplies an output signal with a wide clamping section or region according to the characterisitic curve K is also produced here.

While the present exemplary embodiments are restricted to specific rotation angle ranges, it goes without saying that the difference angle displacement sensor 1 is not restricted to these rotation angle ranges. Rather, any configurations with different maximum rotation angles are possible.

In order to further increase the linearity of the characterisitic curve K, it is also feasible to vary the lengths of the individual sections A, B, C, D and E or to attach soft-magnetic metal sheet under or to the side of the measurement value transducer 2.

Figure 4:
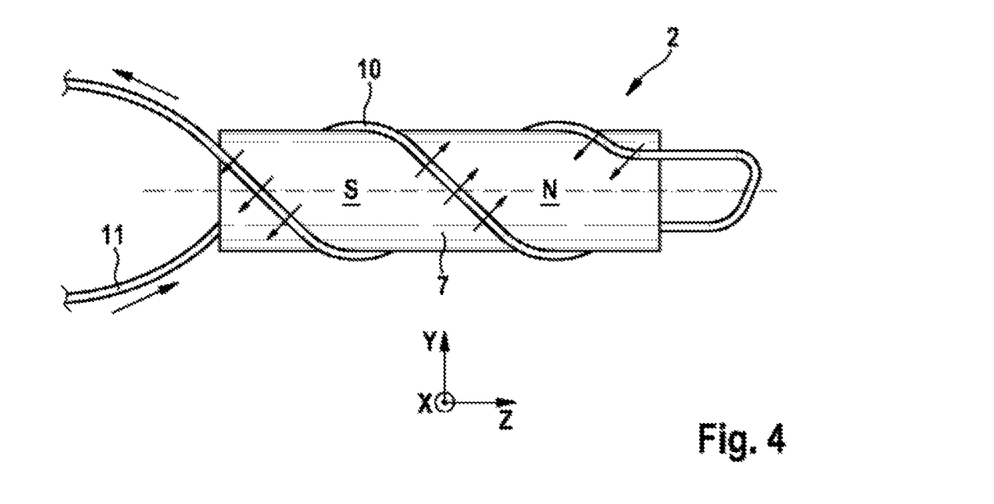
FIG. 4 shows a further exemplary embodiment of a measurement value transducer of the displacement sensor.

However, a permanent magnet 7 is preferably helically magnetized, as shown in FIG. 4 by way of example, in order to obtain the rotating magnetic field and an advantageous characterisitic curve K. According to the further exemplary embodiment, provision is advantageously made for the magnet to be molded directly onto a holder or the main body 9 in a helically magnetized manner.

In the present case, the two measurement sensor units 3, 4 have, as measurement sensors, Hall sensors or XMR sensors. These can be integrated into the difference angle displacement sensor 1 in a cost-effective manner. However, it goes without saying that other sensor concepts can also be used for the measurement sensors.

While the exemplary embodiments of FIGS. 1 and 3 each show measurement value transducers 2 with a rectangular cross section, the cross section is circular, semicircular, triangular, oval or polygonal according to a further exemplary embodiment. The exact contour of the cross-sectional shape can ultimately be selected as desired. The contour of the cross section of the measurement value transducer 2 preferably corresponds to a guide contour of the housing 3, so that the measurement value transducer 2 is mounted in a rotationally fixed manner in the housing 3 such that it can be displaced in the displacement direction 6. This also ensures that the orientation of the measurement value transducer 2 and of the magnetization directions according to the arrows 8 in relation to the measurement value sensors 3 and 4 is always correct.

As already mentioned above, the permanent magnet 7 is preferably helically magnetized. In this respect, FIG. 4 shows a simplified illustration of an advantageous method for producing a measurement value transducer of this kind. To this end, FIG. 4 shows an enlarged partial view of the measurement value transducer 2 which is surrounded by a winding wire 10 which is wound to form a helical coil 11. The coil 11 is arranged coaxially in relation to the permanent magnet 7 and current is applied to it for magnetization purposes, so that a north pole N and, beneath it, a south pole S are produced across the winding wire into which the current is passed. In principle, each pole N, S determines a full-value opposite pole on the rear side lateral surface of the permanent magnet which is, in particular, of circular-cylindrical design in this case.

As soon as the magnetization has been produced, the profile of the magnetization corresponds to the helical profile of the coil 11. Therefore, the magnetization or the magnetic field orientation thereof extends helically along the magnet body or the permanent magnet 7. Then, the coil 11 is removed and the permanent magnet is installed in the housing 5.

The gradient of the helical profile is preferably constant at least in sections. As an alternative or in addition, the profile of the coil 11 or of the magnetic field has a changing gradient at least in sections, in particular a continuously or a discontinuously changing gradient. Therefore, the permanent magnet 7 has, for example, a plurality of sections with different gradients. At least one of the sections can also be designed as a clamping section, as described above, in which the gradient is equal to zero. Therefore, the characterisitic curve of FIG. 2 can likewise be produced by the magnetization. While FIG. 3 shows that the clamping section is located at one end of the permanent magnet 7, provision is made according to an alternative exemplary embodiment for the clamping region to be situated centrally or at least at a distance from the ends of the permanent magnet 7. A plurality of clamping regions between which, in particular, sections with a gradient of the profile which is not equal to zero are formed in each case can also be provided.

Figure 5:
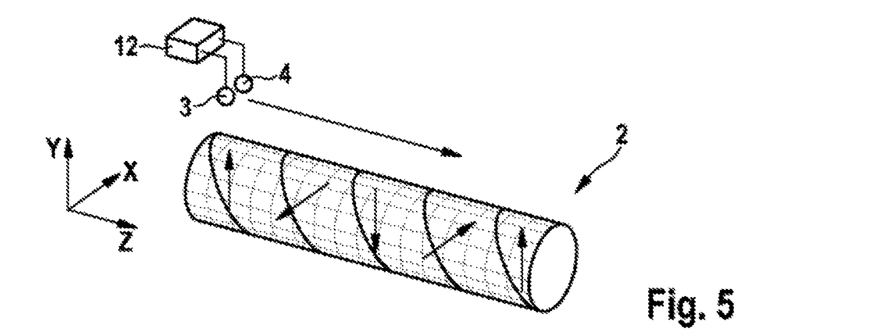
FIG. 5 shows an advantageous arrangement of sensor units of the displacement sensor according to a first exemplary embodiment.
Figure 6:
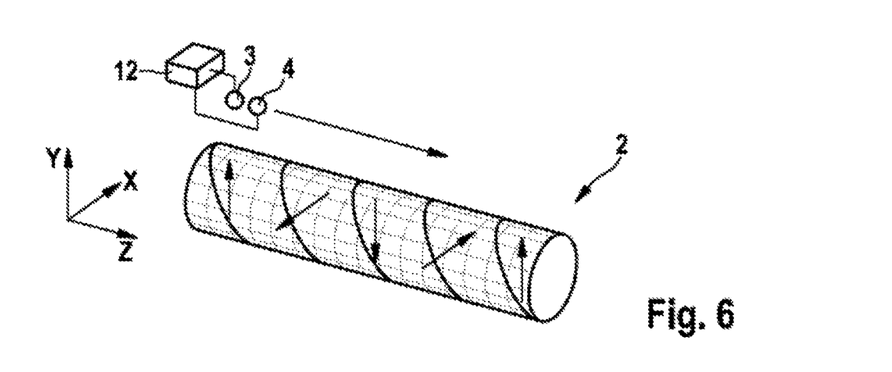
FIG. 6 shows an advantageous arrangement of the sensor units according to a second exemplary embodiment.

A differential measurement principle for determining the displacement position of the measurement value transducer 2 will be explained in more detail below with reference to FIGS. 5 and 6. To this end, FIGS. 5 and 6 each show the measurement value transducer 2, which has been helically magnetized in accordance with the exemplary embodiment of FIG. 4, and also the two sensor units 3 and 4 which are associated with the measurement value transducer 2. The two shown exemplary embodiments of FIGS. 5 and 6 differ in that the sensor units 3 and 4 are arranged next to one another in the sliding direction according to the exemplary embodiment of FIG. 5 and one behind the other in the exemplary embodiment of FIG. 6.

Both sensor units 3, 4 are designed to ascertain in each case at least two different measurement variables of the measurement value transducer 2, in particular magnetic field components which act in different directions. Therefore, the sensor units are designed to detect magnetic field variables in the x, y and/or z direction according to the x, y, z coordinate system shown in the figures. In particular, the same two measurement variables are detected by the sensor units 3, 4 in order to be able to form two difference values from which the difference angle is then determined. Therefore, according to a first exemplary embodiment, the difference angle is ascertained from the measurement values, detected by the sensor units 3, 4, in the x direction on the one hand and the y direction on the other hand (Bx3-Bx4, By3-By4) or from the measurement variables in the y direction and z direction (By3-By4, Bz3-Bz4), wherein the arctangent is calculated in order to ascertain the angle. In this case, the calculation or evaluation of the ascertained sensor values is performed by an evaluation device 12 which is connected to the sensor units 3, 4. The evaluation device 12 has, for example, a microprocessor or an ASIC circuit by means of which the evaluation of the sensor signal is performed.

The differential measurement produces, in particular, the characterisitic curve shown in FIG. 2. The displacement sensor can also be referred to as a difference angle displacement sensor 1 in this respect. Since difference values are formed from the measurement values of the same measurement variable, the influence of external interference fields on the measurement result is prevented, so that the displacement sensor 1 operates particularly robustly in relation to external interference fields, this allowing wide application of the displacement sensor under an extremely wide variety of boundary conditions. In the variant of FIG. 5, with sensor units arranged next to one another, the measurement variables are advantageously detected in the x and y direction because a sufficiently high difference field signal for evaluation is still available here even given very small magnetic field direction changes in the displacement direction, so that, for example, the measurement region can be extended. This is advantageous particularly when a measurement region with a high degree of sensitivity, that is to say in particular with a flat characterisitic curve, is required.

As an alternative, in each case two angles can also be determined with just one 3D sensor element by means of the magnetic field sensor units 3, 4, said angles being formed in one case as magnetic field components in the plane perpendicular in relation to the displacement direction, in particular in the y direction, and in one case from the magnetic field components parallel in relation to the displacement direction (z direction). A particularly high degree of accuracy of measurement can be achieved by measuring both angles.

The invention claimed is:

1. A displacement sensor comprising:
a magnetic measurement value transducer; and
at least two sensor units arranged in different positions at a distance from one another, wherein the measurement value transducer is mounted displaceably in a displacement direction relative to the at least two sensor units, and
wherein the measurement value transducer is magnetized in such a way that the measurement value transducer has a magnetic field which rotates at least in sections about a rotation axis along the measurement value transducer,
wherein the rotation axis of the magnetic field is oriented parallel in relation to the displacement direction of the measurement value transducer,
wherein each of the at least two sensor units is configured to detect two magnetic measurement variables proportionally in relation to the magnetic field strength, wherein both of the two measurement variables are detected by each of the at least two sensor units, and
wherein the at least two sensor units are arranged next to one another in the displacement direction.

2. The displacement sensor as claimed in claim 1, further comprising:
an evaluation device configured to determine two difference values from the two measurement variables detected by both sensor units and to determine a sliding position from the two difference values.

3. The displacement sensor as claimed in claim 1, wherein each of the at least two sensor units detects, as the two measurement variables, magnetic field components of the measurement value transducer in at least two measurement directions which are perpendicular in relation to one another.

4. The displacement sensor as claimed in claim 3, wherein the at least two measurement directions are oriented perpendicularly in relation to the displacement direction.

5. The displacement sensor as claimed in claim 3, wherein at least one of the at least two measurement directions is oriented parallel in relation to the sliding direction and at least one further measurement direction of the at least two measurement directions is oriented perpendicularly in relation to the displacement direction.

6. The displacement sensor as claimed in claim 1, wherein a magnetization of the measurement value transducer has a constant gradient at least in sections.

7. The displacement sensor as claimed in claim 1, wherein a magnetization of the measurement value transducer has a gradient that changes at least in sections.

8. The displacement sensor as claimed in claim 7, wherein the gradient changes continuously or discontinuously.

9. The displacement sensor as claimed in claim 1, wherein the measurement value transducer is at least substantially helically magnetized.

10. The displacement sensor as claimed in claim 1, wherein the measurement value transducer is formed from at least permanent magnet.

11. The displacement sensor as claimed in claim 1, wherein the measurement value transducer comprises a plurality of permanent magnets which are connected to one another.

12. The displacement sensor as claimed in claim 1, wherein the measurement value transducer has at least one clamping section in which a gradient of the rotation of the magnetic field in a longitudinal direction of the measurement value transducer is equal to zero.

13. A method for operating a displacement sensor, which comprises a magnetic value transducer and at least two sensor units arranged in different positions at a distance from one another, the two sensor units arranged next to one another in a displacement direction, the measurement value transducer being mounted displaceably in the displacement direction relative to the at least two sensor units, the measurement value transducer being magnetized in such a way that the measurement value transducer has a magnetic field which rotates at least in sections about a rotation axis along the measurement value transducer, the rotation axis of the magnetic field being oriented parallel in relation to the displacement direction of the measurement value transducer, the method comprising:

- detecting two measurement variables proportionally in relation to a magnetic field strength of the magnetic field with each sensor unit, wherein both measurement variables are detected by each of the at least two sensor units;
- ascertaining a difference value from the two measurement variables which are detected by the at least two sensor units; and
- determining a position of the measurement value transducer based on the difference value and the two measurement variables.

14. The displacement sensor as claimed in claim 1, wherein the measurement value transducer is formed from only one permanent magnet.

15. A displacement sensor comprising:

a magnetic measurement value transducer; and
at least two sensor units arranged in different positions at a distance from one another,
wherein the measurement value transducer is mounted displaceably relative to the at least two sensor units,
wherein the measurement value transducer is magnetized in such a way that the measurement value transducer has a magnetic field which rotates at least in sections about a rotation axis along the measurement value transducer,
wherein the rotation axis of the magnetic field is oriented parallel in relation to the displacement direction of the measurement value transducer, and
wherein each of the at least two sensor units is configured to detect two magnetic measurement variables proportionally in relation to the magnetic field strength, wherein both of the two measurement variables are detected by each of the at least two sensor units, and
wherein the measurement value transducer has at least one clamping section in which a gradient of the rotation of the magnetic field in a longitudinal direction of the measurement value transducer is equal to zero.

* * * * *